Patented Aug. 22, 1950

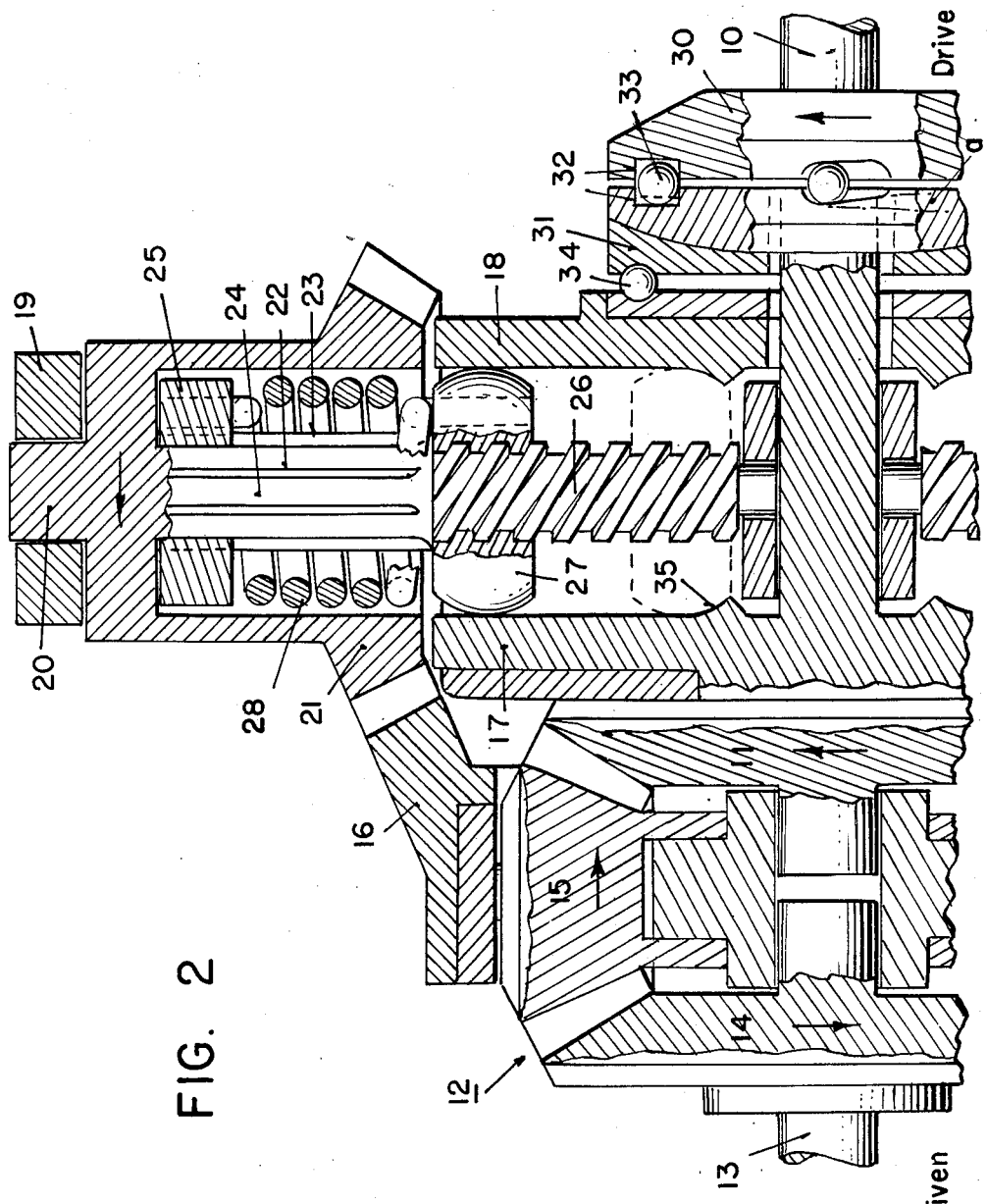

2,520,057

UNITED STATES PATENT OFFICE 2,520,057

VARIABLE SPEED POWER TRANSMISSION

Ernesto Pulese, Rome, Italy, assignor of fifty per cent to C. E. Dominguez, New York, N. Y.

Application July 3, 1947, Serial No. 758,838

2 Claims. (Cl. 74—751)

This invention relates to power transmission, and more especially to power couplings of the type which are capable of automatic, infinite, torque-speed variation between the driving and driven elements. Devices of this character, while having wide application throughout the power industries, find a special adaptation in the automotive industry.

It is the primary object of the present invention to provide a completely automatic power coupling between driving and driven elements of an automotive transmission in which the ratio of driving torque to driven resistance is automatically adjusted.

It is another object to provide such a transmission in which the speed-torque gradient is continuous, whereby the engine is capable of operating at optimum speed irrespective of the conditions of resistance or lack of resistance to which the driven elements are committed.

It is a further object to embody in an automotive transmission a change-speed power coupling of high efficiency, especially in the direct coupling relationship which constitutes the prevalent ratio under normal operating conditions.

It is still a further object to provide an automotive transmission that is of simple and durable construction and one which may be readily adapted to the present day automobiles without requiring substantial redesign or adaptation of parts for its accommodation.

These and other objects and advantages will be more fully understood when the following specification is read in conjunction with the accompanying drawings, in which:

Fig. 2 is an enlarged, fragmentary, side-elevational view of one of the elements of the present invention shown partly in section.

Figure 1:
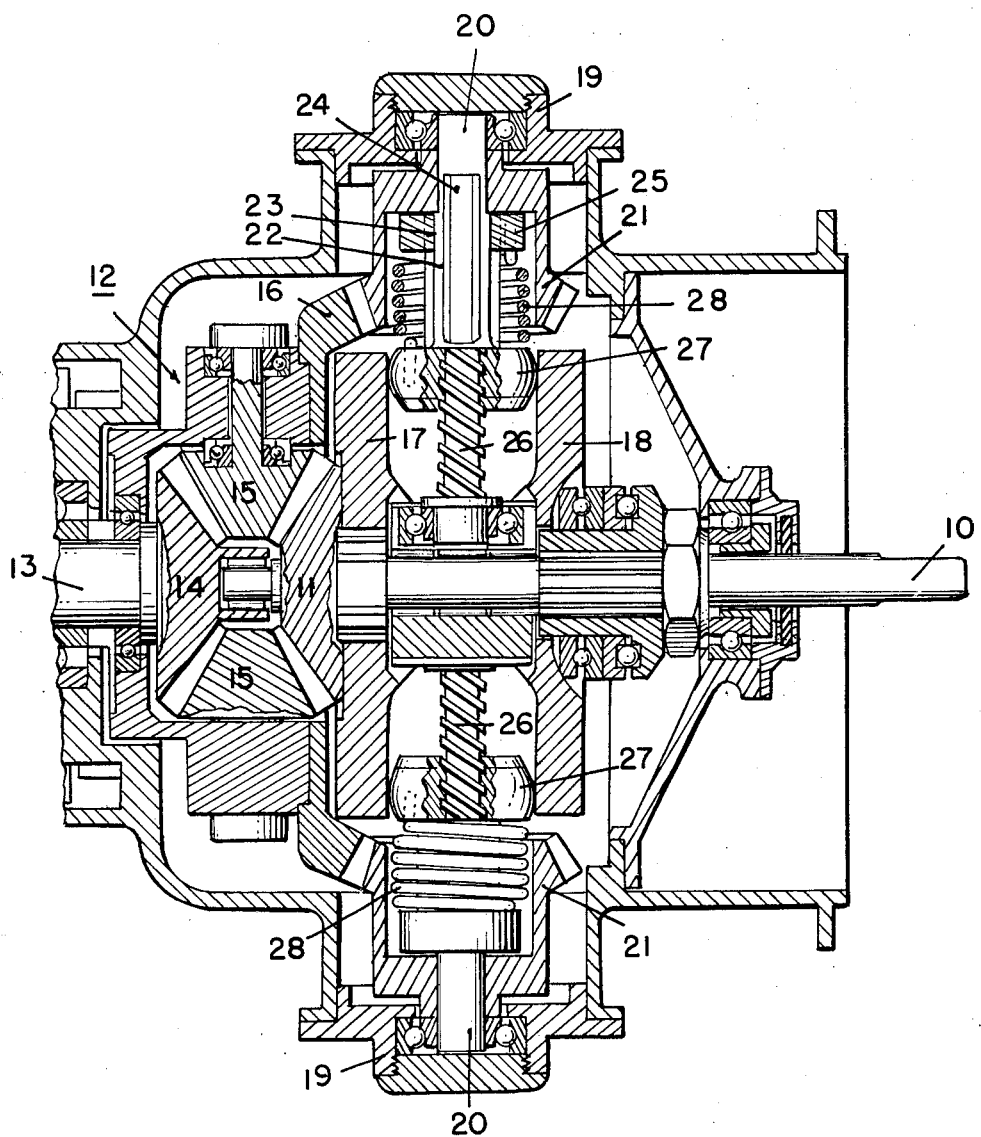
Fig. 1 is a vertical, mid-sectional, elevational view of a transmission built in accordance with one form of the present invention, with some of the parts shown in elevation and other parts shown in section.

Referring now more particularly to the drawings, in which like characters of reference refer to like parts throughout, the engine shaft of the machine is represented at 10, to the end of which a beveled gear 11 of a differential mechanism 12 is permanently secured in direct drive relationship. The driven shaft 13 of the differential is provided with a similar beveled gear 14 in coaxial alignment with the drive shaft 10. Interposed between the two gears 11 and 14 are satellite pinions 15 which are revolubly mounted upon a reactor or conic ring gear 16 by suitable bearings disposed radially of the drive shaft 10.

From the foregoing it will be understood that the parts 11, 15 and 14 constitute a planetary gear or gearing interposed between the shafts 10 and 13 for transmitting rotary motion from the drive shaft 10 to the driven shaft 13 in the usual or common manner.

The present invention has for its object to provide for controlling the operation of the planetary gearing by the rotation of the drive shaft 10 so as to automatically impart a variable drive to the shaft 13 in accordance with the rate of rotation of the drive shaft without the use of any form of manually actuated gear shaft mechanism.

The driving shaft 10 has rigidly associated therewith a friction plate 17 which is associated with a complementary disc 18 disposed in coaxial relation therewith but which is free-running on the drive shaft 10. The casing 19 is provided with suitable anti-friction bearings in which the journals 20 of beveled pinions 21 are revolubly mounted. These pinions 21 are in driving engagement with the reactor or conic gear 16 and are adapted to be revolved thereby in response to differential reaction between the gears 11 and 14.

Each of the beveled pinions 21 is provided with an axial extension 22 disposed radially of the drive shaft 10 between the friction discs 17 and 18 previously mentioned. The portion of the axial extension nearest the beveled pinion, indicated at 23, is provided with splines 24 with relation to which a collar 25 is disposed for axial movement along the extension 22 in such a manner as to have no relative, revolutionary movement in relation to the beveled pinions 21. The portions of the axial extensions 22 lying between the disks 17 and 18 are provided with threading 26 upon which is carried a roller or follower 27 with internal, complementary threading, which by revolving on the threading 26, moves axially of the extension 22 carried by the pinions 21. A spring 28 is made fast to the follower 27 at one end and is anchored to the collar 25 at its opposite end.

The relationship of parts just described is such that where the angular velocities of the disc 17 and the beveled pinions 21 are at variance, the follower 27 will be propelled along the axial extension 22 into various positions of contact with the disc 17, thus to vary the effective drive area of the latter and in turn to influence the revolutionary rate of the beveled pinions 21 with relation to the spider or conic gear 16.

As shown in greater detail in Fig. 2, the drive shaft 10 has integrally associated therewith in coaxial relation a plate 30, opposed to which is another coaxial plate 31, mounted in free-running relation to the drive shaft 10. The opposed faces of the plates 30 and 31 are apertured as at 32 to accommodate ball bearings 33 for purposes presently to become apparent. The inner wall of the apertures carried in one of the plates is disposed at an angle shown at $a$ in such a manner as to cause the ball bearings to increase the axial dimension between the plates 30 and 31 incident to the application of driving torque to the shaft 10. This axial component is in turn imparted through thrust bearings 34 to the free disc 18, which in turn serves to increase the tractive friction between the followers 27 and the disc 17, which is carried, together with the gear 11, upon the drive shaft 10.

With the foregoing organization in mind, the operation of the device is as follows:

Let it be assumed that the drive shaft 10 is being revolved. The disc 30 and its counter disc 31 are actuated, by virtue of reasons already assigned, to exert an axial thrust upon the disc 18, the pressure of which is a function of the driving momentum, which pressure necessarily increases beyond that initially realized when the parts are at rest. The disc 17 and gear 11 revolve together with the drive shaft 10. The revolution of the gear 11 causes the satellites 15 to rotate on their axes, and the reactive pressure of the satellites tend to cause the driven gear 14 to revolve, upon which the resistant moment is exerted.

Under these conditions two assumptions must be considered:

The first of these is where the torque applied by the drive shaft is greater than or equal to the resistant moment effective upon the driven elements. Under this condition, when the gear 11 is revolving, the satellites 15 also revolve on their axes, and if free, will travel around and upon the gear 14. However, the axes of revolution of the satellites 15 are fixed to the reactor or conic gear 16, which, in turn, is engaged by the beveled pinions 21 to which the axial extensions 22 are rigidly fixed, and which are influenced by the follower rollers 27. These latter will also revolve, since they are fastened to the axial extensions by the threading 26 and by the springs 28, and further, because the disc 17, which is connected to the driving gear 11, is also revolving.

The follower rollers 27, therefore, revolve for a double reason; but since they are connected positively to the beveled pinions 21 by the threaded component 26 and spring 28, they are compelled to roll on the face of the disc 17, which, through the beveled pinions 21 and the conic gear 16, causes the satellites 15 to rotate. At a predetermined position of the roller 27 along the screw-threaded shaft portion 26 and consequently in a predetermined position radially of the friction disk 17 and with the beveled gears 16 and 21 given a predetermined ratio, the gear 16 will rotate at the same speed in the same direction as the gear 11 and the unit will be in locked condition. In this relationship the power coupling is direct, and, as such, functions as a toothed union in direct drive.

Under the second assumed condition, the drive torque of the motor is less than the resistant moment of the driven elements. In this case, the driven gear 14 will tend to remain stationary but the driving gear 11 will be able to revolve under the influence of the drive shaft 10. The satellites 15 will then tend to roll on the driven gear 14, which is temporarily immobilized by the superior resistant moment. The satellites 15 will, therefore, assume a velocity of rotation tending toward one-half that of the revolution of the driving gear 11 and of the disc 17 associated with the latter. The roller followers 27 are turned by the disc 17, and since these are joined by the axial extension 22 and associated spring 28 with the beveled pinions 21, these by virtue of the reactor or conic gear 16, will have a rotational velocity equal to that of the satellites 15, which will be less than that of the gear 11 and associated disc 17. The followers 27 will therefore be compelled to travel along the thread of the axial extensions 22, moving radially, inwardly of the discs 17 and 18, meeting progressively smaller effective drive areas thereof, from which greater moments obtain by reason of lesser velocities.

The reaction of the followers 27 on the threads 26 and springs 28 increases and is transmitted through the beveled pinions 21 and conic gear 16 to the satellites 15, which in turn transmit the force to the driven gear 14 until the latter acquires the moment needed to overcome the resistance, finally obliging it to revolve. In their inward, radial travel, the followers 27 can move down as far as the minimum periphery of the disc 17 and 18, which corresponds to the maximum moment, until they rest against the inner, raised crown 35 of the discs, which in addition to limiting the range of movement of the followers, also furnishes the best surface for tractive friction.

Upon reaching the position of equilibrium between the resistant moment and the driving momentum, the differential will revolve at the appropriate differential speeds; but if the resistant moment should diminish, as happens once starting inertia is overcome, the momentary motive forces increase. Under this condition the driven gear 14, responsive to a force that has become greater, accelerates, and with it the satellites 15 are caused likewise to rotate at an accelerated rate which is imparted to the beveled pinions 21 through the reactive gear 16. This in turn means that the axial extensions 22 of the beveled pinions sustain an increase in revolutionary speed in relation to the followers 27, which are forced by the threading 26 and reaction of the spring 28 to travel back along the extension 22 through successive positions of equilibrium until the initial position at the largest effective area of the discs 17 and 18 is attained with a resistant moment equal to or less than the optimum momentum of the engine under conditions of direct drive.

A study of the foregoing will reveal that the performance characteristics of a power coupling constructed in accordance with the present invention is possessed of high efficiencies which, under conditions of direct coupling, are in the order of 98 to 99 per cent. In the lower gear relationships, the efficiency, while somewhat less than the direct coupling efficiency, is still extremely high and should be in the order of from 95 to 97 per cent, which is far superior to any comparable organization adapted for similar purposes today.

As in most automotive applications, it is desirable to provide for neutral and reverse positions by which the drive may be inactivated or made to turn the driven parts in counter-revolution. Such adaptations are well known to the art and are not specifically a part of the present invention. It might be mentioned, however, that neutral position can be obtained by any arrangement in which the beveled pinions 21 may be disengaged from the spider or conic gear 16 so that the satellites 15 would be free to travel on the driven gear 14 without the transmission of driving moment. For reverse drive, a gearing train, by virtue of the usual interposition of idler pinions, may be applied betwen the beveled pinions 21 and the conic gear 16, so as to impart counter-revolutionary effort thereto from the drive shaft 10, and, in this manner, cause the transmission to be effective for reverse as well as forward movements.

From the foregoing it will be appreciated that by application of the present invention to automotive uses, the engine is never overloaded or raced with a consequent saving in fuel and engine life. By characteristics peculiar to the present invention, the power coupling on all intermediate torque-speed relationships less than unity (direct coupling) is always connected to the engine with a momentum similar to that of the engine in direct coupling; and there is in part enjoyed the characteristics of free-wheeling without the defects of the latter, since the braking action of the engine is always available when the accelerator pedal is in the raised position. Finally, as the automatic gear shift herein described is a momentum and velocity transformer, it has a high efficiency in all gear ratios, especially direct coupling, where it acts as a link between the engine and the driven wheels. Its size and weight are of the same order as standard gear shifts, whereby it is adapted to installation without drastic redesign or modification of the present day facilities with which power transmissions are associated.

From the foregoing, it will be understood that many modifications and changes may be made in the transmission herein disclosed, which, while departing from the letter of this description, will still be within the spirit of the invention as disclosed herein, as is apprehended in and by the following claims.

I claim as my invention:

1. Variable speed power transmission comprising a rotary drive member, a rotary driven member, a drive connection between and coupling said members for a drive between the members and including beveled gears on said members and satellites, between and in mesh with the said beveled gears means actuated by said drive member for automatically controlling the operation of the drive connection to transmit variable speeds from the drive member to the driven member and including a rotatable spider having a gear and carrying the satellites, a friction disk carried by the driving member, a roller in frictional engagement with the friction disk, a rotatable shaft disposed radially of the drive shaft and having a threaded portion on which the roller is mounted to travel, spring means tending to move the roller towards the driving member, a pinion driven by the roller shaft and meshed with the gear on the spider, a movable friction disk carried by the driving member and movable longitudinally thereof into frictional engagement with the periphery of the roller, means carried by the driving shaft and actuated by the torque thereof for pressing the movable friction disk against the roller to clamp the latter between the friction disks.

2. The combination with a casing, of axially aligned drive and driven shafts mounted therein, a drive connection between and coupling said shafts for drive between said shafts and including a beveled gear fixed to the driving shaft, a beveled gear fixed to the driven shaft and satellites between and in mesh with the beveled gears, a spider rotatably mounted upon the casing in axial alignment with the shafts and carrying the satellites and provided with gear teeth, fixed and movable friction disks carried by the driving shaft, a friction roller between and in frictional engagement with the friction disks, a rotatable shaft disposed between the disks and extending radially of the drive shaft and having its outer end journaled in the casing, said shaft having a screw threaded portion on which the roller is mounted to rotate therewith and travel thereon, a gear carried by the outer end portion of the screw threaded shaft and in mesh with the gear teeth of the spider, spring means acting in one direction against said latter gear on the screw-threaded shaft and in the opposite direction against the outer face of the roller, and means carried by the driving shaft and actuated by the torque thereof for pressing the movable friction disk against the periphery of the roller.

ERNESTO PULESE.

REFERENCES CITED

The following references are of record in the file of this patent:

UNITED STATES PATENTS

| Number | Name | Date |
|---|---|---|
| 452,445 | Wattles | May 19, 1891 |
| 607,640 | Schneider | July 19, 1898 |
| 1,559,975 | Murray | Nov. 3, 1925 |
| 2,157,238 | Hunt | May 9, 1939 |